(12) United States Patent
Croman et al.

(10) Patent No.: US 7,225,264 B2
(45) Date of Patent: May 29, 2007

(54) SYSTEMS AND METHODS FOR DELIVERING CONTENT OVER A COMPUTER NETWORK

(75) Inventors: Joe D. Croman, Sudbury, MA (US); Christopher N. Anderson, Royal Oaks, CA (US); Robert Rees, Waltham, MA (US); Seth Silverman, Lexington, MA (US); Yishai Sered, Newton, MA (US); Mark W. Eichin, Concord, MA (US)

(73) Assignee: Softricity, Inc., Boston, MA (US)

( * ) Notice: Subject to any disclaimer, the term of this patent is extended or adjusted under 35 U.S.C. 154(b) by 1073 days.

(21) Appl. No.: 09/951,124

(22) Filed: Sep. 12, 2001

(65) Prior Publication Data

US 2002/0156911 A1    Oct. 24, 2002

Related U.S. Application Data

(60) Provisional application No. 60/231,992, filed on Sep. 11, 2000, provisional application No. 60/108,602, filed on Nov. 16, 1998.

(51) Int. Cl.
*G06F 15/173* (2006.01)

(52) U.S. Cl. ....................... 709/232; 709/224
(58) Field of Classification Search ............ None
See application file for complete search history.

(56) References Cited

U.S. PATENT DOCUMENTS

| | | | |
|---|---|---|---|
| 5,793,966 A | 8/1998 | Amstein et al. | |
| 5,805,804 A | 9/1998 | Laursen et al. | |
| 5,832,483 A | 11/1998 | Barker | |
| 5,867,667 A | 2/1999 | Butman et al. | |
| 5,925,100 A * | 7/1999 | Drewry et al. | 709/219 |
| 6,002,872 A | 12/1999 | Alexander, III et al. | |
| 6,006,251 A | 12/1999 | Toyouchi et al. | |
| 6,038,601 A | 3/2000 | Lambert et al. | |
| 6,055,572 A * | 4/2000 | Saksena | 709/224 |
| 6,070,009 A | 5/2000 | Dean et al. | |
| 6,088,718 A * | 7/2000 | Altschuler et al. | 709/203 |
| 6,108,703 A | 8/2000 | Leighton et al. | |
| 6,112,239 A | 8/2000 | Kenner et al. | |
| 6,216,173 B1 | 4/2001 | Jones et al. | |
| 6,279,001 B1 | 8/2001 | DeBettencourt et al. | |
| 6,282,573 B1 | 8/2001 | Darago et al. | |

OTHER PUBLICATIONS

James Griffioen et al., Automatic Prefetching in WAN. In IEEE Workshop on Advances in Parellel and Distributed Systems, Oct. 1993, pp. 8-12.*

Chandra Krintz et al., Reducing Transfer Delay Using Java Class File Splitting and Prefetching, Proceedings of 14th SIPLAN conference on Object-oriented programming, systems, languages, and applications, Nov. 1999, pages 276-290.*

* cited by examiner

*Primary Examiner*—Patrice L. Winder
(74) *Attorney, Agent, or Firm*—Senniger Powers

(57) ABSTRACT

Systems and methods for, inter alia, allowing a remote user to access content, such as data or an executable program, on demand from a remoter server. When accessed the content can be delivered on demand to the user's remote workstation for use by the user. As network resources may vary, the systems described herein further include systems that will monitor network resources, and other factors, versus the transfer demands for the content requested by the user. The systems may then determine a schedule, or load map, for transferring blocks of the content in a way that efficiently employs the available resources, and in a way that provides the user with a user-experience that is similar, or substantially similar, to the user-experience that the user would have if the content were stored locally on the user's workstation.

38 Claims, 3 Drawing Sheets

SYSTEMS AND METHODS FOR DELIVERING CONTENT OVER A COMPUTER NETWORK

REFERENCE TO RELATED APPLICATIONS

This application incorporates by reference the teachings of the following US Patent Applications and PCT applications: 60/231,992 entitled Systems and Methods for Delivering Content Over a Computer Network, filed 11 Sep. 2000 and naming Joe D. Croman as an inventor; as well as U.S. patent applications Ser. Nos. 60/108,602; 09/310,294 now U.S. Pat. No. 7017,188; Ser. No. 09/311,923 now U.S. Pat. No. 6,374,402; Ser. No. 09/310,229 now U.S. Pat. No. 6,763,370; Ser. No. 09/439,906 now abandoned; and PCT application PCT/US99/27113.

FIELD OF THE INVENTION

This invention relates to methods and systems for delivering content over a computer network, including delivering executable and data content that may be executed by a remote user in real time.

BACKGROUND OF THE INVENTION

Today, interconnectivity over data networks continues to expand. Most companies today have an internal network, many of which provide high speed data delivery to terminals on the network. Additionally, the Internet provides interconnectivity between networks, and terminals that are located across the globe.

With the interconnectivity provided by the Internet and other networks, systems have been proposed that would allow users to license, on a per use or per hour basis, access to a software title such as Microsoft PowerPoint, games or a patent docketing software package. In these systems, once the user has been granted access to the title, the user can execute the title and employ the software as needed. Typically, the application service providers have employed a telnet type architecture that has directed the user to employ the user workstation as a terminal, while computing takes place on a remote processor that has execution access to the selected title. Alternatively, systems have employed an NFS kind of architecture that joins a remote file system into the file systems of the local user.

Other systems have been proposed that would provide access to executable programs that have a distributable component architecture. These titles, commonly written in Java, may be downloaded piecemeal to the remote user, for execution by that user on the user's local terminal.

Although such component systems can work well, they require that applications familiar to the user be re-written into a distributable architecture that allows for easy download over the Internet. Moreover, systems based on telnet technologies or on NFS technologies create problems with burdening the processing resources of the remote machine and of security.

SUMMARY OF THE INVENTION

The systems and methods of the invention include, inter alia, systems for allowing a remote user to access content, such as data or an executable program, on demand from a remote server for local execution. When accessed the content can be delivered on demand to the user's remote workstation for use by the user, providing the user with an experience comparable to the user experience provided when accessing the content locally. As network resources may vary, the systems described herein further include systems that will monitor network resources, and other factors, versus the transfer demands for the content requested by the user. The systems may then determine a schedule and method, or load map, for transferring blocks of the content in a way that efficiently employs the available resources, and in a way that provides the user with a user-experience that is similar, or substantially similar, to the user-experience that the user would have if the content were stored locally on the user's workstation.

In one example system, a user at a remote workstation may request access to content, such as an executable program. In response to this request, the system transfers blocks of content to the user, where each block contains either data, content or executable code that the remote workstation can employ to execute the application locally. The system may continue to allow the workstation to retrieve portions of the executable program as the application requires. Optionally, the systems described herein may also employ predictive threading to preselect requests for content given the resource constraints of the network.

More specifically, the systems and methods described herein include a profiler process that analyzes the content access pattern, which can include the disk access or memory access pattern of an executing title and generates a load map. This process can collect information about how the title is accessed from storage as the user employs the title. Different user scenarios and choices can be analyzed, and patterns of storage access may be generated.

To this end, the profiler may observe and analyze the execution of the executable content and/or data. During analysis of the content, the file access pattern of the executable content may be observed. The profiler may then create a load map that is representative of the disk access or other file or memory access that are made as a user selects among the different options provided by the content.

The systems described herein may also include a map reader. The map reader may be a computer process that interprets the load map created by the profiler and creates one or more cache preload requests. The cache preload requests may be representative of requests from the client to the remote server for additional components of the executable title.

In one embodiment, a cache manager is provided wherein the cache manager communicates with the map reader and responds to, inter alia, preload requests from the map reader.

Thus the systems described herein include scheduling processes that more efficiently use network resources to facilitate the real-time execution of the program.

More specifically, the systems and methods described herein include a method of transmitting data over a network, to support execution of a program at a remote location. The methods may comprise determining a measure of available throughput for transmitting data over the network. The method, in certain practices, but not all, may include, identifying information to be transmitted over the network and generating a forward-looking load map of information for a given execution state of the program, and based on the load map and the execution state, generating an anticipatory load request for transmitting the information within the available throughput and for maintaining consistent execution of the program. In these methods, the information comprises at least one of data or an executable file. The information may be transmitted from a server to a client.

The act of identifying information may include selecting information based on the available throughput and the execution state of the program at a time of selection. Information may be packaged, or be associated with load maps that are more suited to one throughput than another, or that are associated with a fee structure that provides one level of service versus another. Additionally and optionally, the methods may further include the acts of the client requesting information to be transmitted, the client selecting a subset of the information based on the available throughput at a time of selection, and the client selecting, for transmission from the server to the client, information from the subset of the information. In certain other practices, the client requests information to be transmitted, and if the request is approved, receives a key adapted to access the information for transmission from the server to the client. Additionally, the methods may include methods wherein the forward-looking load map is generated based on an access pattern for the transmitted information. The access pattern may include the disk access pattern, where the title is run under different scenarios or conditions, and the disk access is monitored under these conditions. From this activity, a load map that maps out a sequence for retrieving data blocks may be generated.

The systems described herein may include a system for transmitting structured information over a network having an identified available throughput, comprising a server providing the information, a client receiving the information from the server, a profiler monitoring transmission of the information from the server and generating at least one load map based on an analysis of an information access pattern at the server, a map reader, based on the at least one load map, for interpreting information contained within a load map and for generating time valued requests to the server based on available throughput and informational requirements, and a cache manager that merges the information to organize the structured information. The cache manager may further include storage means to store at least the information associated with a pre-load operation and may select for merging a block of the information from the storage means, if the block is available, and requests a block from the server, if the block is not yet available. The system may also include a player which arranges for the execution of the structured information.

Additionally, the invention may provide methods for providing multiple levels of support for executing over a computer network a program having blocks of executable code, comprising providing, for a plurality of network performance levels, a plurality of load maps associated with respective ones of said network performance levels and having a list of sections of executable code of the program ordered according to the expected priority of access of the executable code by the program, determining a network performance level available through the network to a client, selecting a load map as a function of the network performance level available, and allowing the client to request sections of the program according to the load map selected. Optionally, the method may include processing the program to generate the plurality of load maps. To this end processing the program includes determining for a respective network performance level a preload list representative of a series of sections of executable code that are to be transmitted over the network prior to execution of the program.

Processing the program includes monitoring execution of the program to determine a sequence of block fetches for moving sections of executable code into computer memory and cache during program execution. Generating an ordered list includes ordering the list to provide a delivery sequence for scheduling delivery of sections of executable code over the network to the client. Generating the ordered list to schedule transmission of executable code over the network during a period of low network activity during program execution.

The method may determine a network performance level by launching a player program at the client capable of exchanging information with a remote server for determining the available network bandwidth, including launching a player program at the client capable of exchanging information with a remote server for determining network latency.

Optionally, determining a network performance level includes determining cache memory available at the client, and selecting a load map includes comparing a network performance level to a threshold level and proceeding to selecting of a load map as a function of the comparison.

Other methods provided herein include a method for providing multiple levels of support for executing over a computer network a program having blocks of executable code, comprising providing a file system management process for monitoring file access operations of a computer program executing within an application memory space, executing the program, employing the file system management process, while the program is being executed, for determining a sequence and a timing pattern with which blocks of executable code are loaded into the application memory space, and processing the sequence and timing pattern to generate a load map representative of a sequence and timing pattern for transmitting blocks of executable code over the network.

As discussed above, generating a load map includes processing the sequence and timing pattern to identify periods during program execution available for transmitting additional blocks of executable code. This may include determining probabilistically the additional blocks of executable code to deliver over the network, as well as processing the sequence and timing pattern while collecting information representative of blocks of executable code requested from a remote site and adjusting the load map as a function of the collected information. Optionally, the method may add trigger controls within the generated load map for controlling post-load execution on a client based on programs file accesses.

Other objects of the invention will, in part, be obvious, and, in part, be shown from the following description of the systems and methods shown herein.

BRIEF DESCRIPTION OF THE DRAWINGS

The foregoing and other objects and advantages of the invention will be appreciated more fully from the following further description thereof, with reference to the accompanying drawings wherein.

DETAILED DESCRIPTION OF THE ILLUSTRATED EMBODIMENTS

Figure 1:
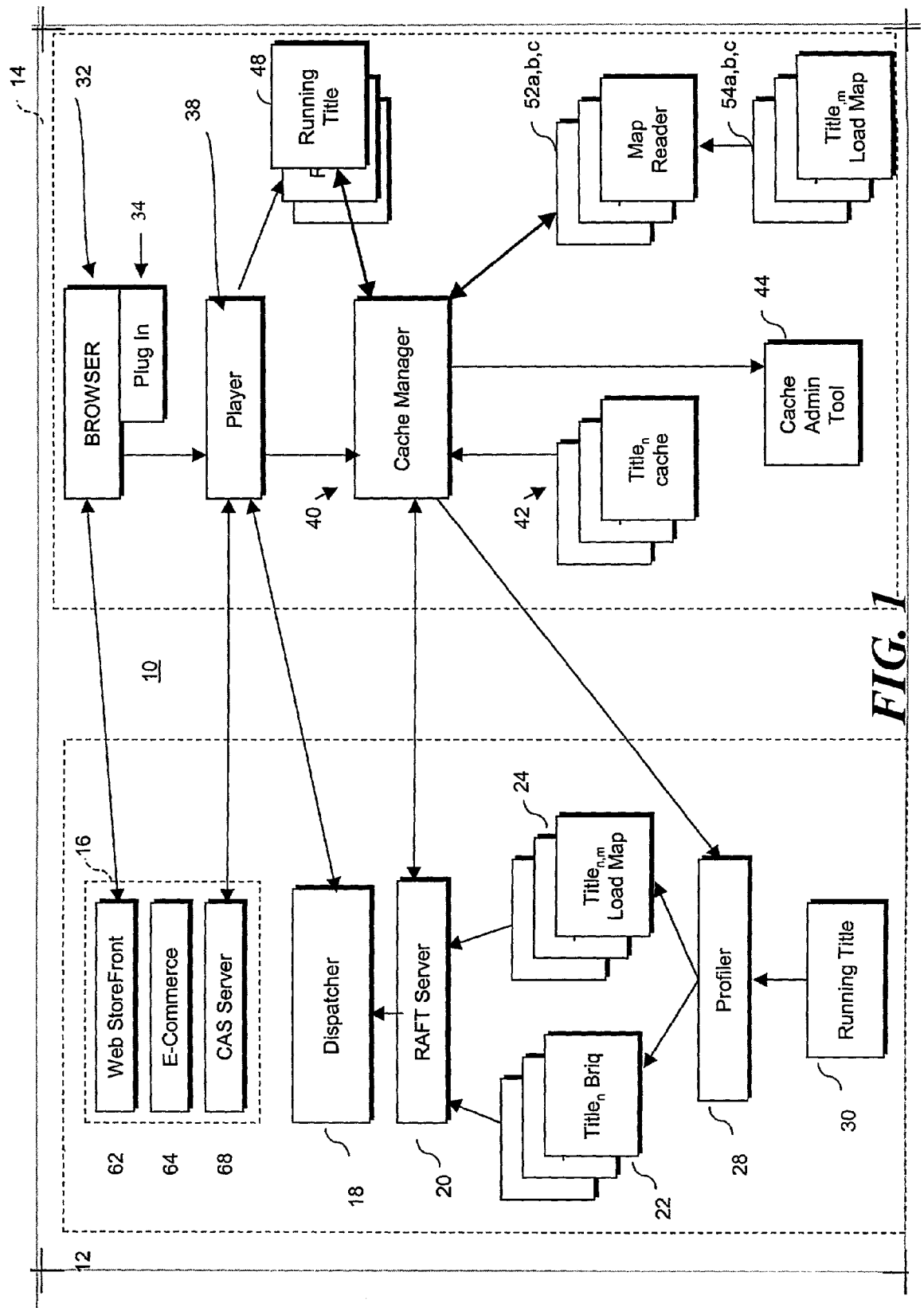
FIG. 1 depicts schematically the structure of one embodiment of a system according to the invention.

To provide an overall understanding of the invention, certain illustrative embodiments will now be described. However, it will be understood by one of ordinary skill in the art that the systems and methods described herein may be adapted and modified for other suitable applications and that such other additions and modifications will not depart from the scope hereof.

The systems and methods described herein include systems for delivering content over a data network, and more particularly include systems and methods for delivering executable content over a data network, in a manner that allows a user at a remote site to access the content on demand to have a user experience that is comparable to the user experience that would be achieved if the content were being accessed locally.

Among the features of the invention is the ability to allow a holder of an executable title to securely deploy that title for use by users at remote client systems, and to provide that user with an acceptable user experience. To this end, and as will be explained in greater detail herein after, the systems and methods described herein include systems and methods that analyze the throughput available for delivering data between the client and the server. Based on this determined throughput, the systems select a delivery schedule and method for transferring data to the client. Moreover, the systems monitor the client's use of the content to determine what other content should be preloaded or cached on the client system, so that the user's access to the content is comparable to the access the user would have if the content was stored locally. Examples of such systems include client/server systems that allow users at a remote client system to access an executable title stored at a remote location and to run that title locally on the client system by retrieving on demand portions of the executable content from the remote server. The systems and methods may further include a mechanism for determining the network characteristics and throughput available for transmitting data between the server and the client. Upon determining the measure of available network characteristics and throughput, the systems and methods described herein employ the determined available network characteristics and throughput to select a load map file suitable for use with a network having the identified characteristics and available throughput. The load map file may, in one embodiment, be a data file associated with the content, or title, that the user at the remote client desires to access from the server and execute locally at the client. To this end, the load map file may be a data file associated with and representative of a title that has been formatted into a package that makes the executable code within the title more easy to segment and to deliver in sections across the data network and to the remote client.

Additionally, the load map may include predictive loading information. The predictive loading information may be information that can be employed by a load map reader to fetch segments of the title from the server. To this end, the load map may include a method and an ordered list of data blocks to be fetched, without considering the progress of the particular title session. After the title is launched, the client is to fetch blocks on this ordered list per the defined method in the given order when the network conditions permit. Optionally, the load map may also include information in a tree structure that is representative of a list of a set of blocks, each set being associated with an additional set of blocks. If the client detects that the blocks in the first order set are being fetched by the title, then the blocks in the second order set are to be loaded. This provides for probabilistic loading. In either case, the load map data file may include information and methods that allows a client to download blocks of executable code from the server to the client. This probabilistic loading, in combination with the use of load maps, can provide the user with a user experience that is comparable to the user experience the user would have if the content were stored locally.

For purposes of illustration, the systems and methods of the invention will be described, in part, with reference to certain illustrated embodiments. These embodiments will largely encompass examples of systems and methods suitable for allowing a user at a remote client to access and execute a computer program, such as a video game or other application, maintained at a remote server. A computer game may comprise both executable code as well as data including images, text and other types of data content. However, it will be apparent to those of ordinary skill in the art that the systems and methods described herein are not to be limited to the applications described below and that the systems and methods of the invention may encompass other applications and features including applications for delivering media content over a network, web browsing, video conferencing and any other application where it will be beneficial to coordinate the available network resources with the expected demands on the network when exchanging data from one site on the network to another site.

One embodiment of a system according to the invention is depicted in FIG. 1. Specifically, FIG. 1 depicts a system 10 that employs a client/server architecture to allow a user on a remote client to execute locally a title that is maintained at a remote server. Specifically, FIG. 1 depicts a system 10 that includes a server 12, that optionally may comprise multiple servers 62, 64, 68, 18 and 20 and a client 14. The structure of the client 12 and the server 14 includes elements described in detail in the above identified U.S. patent applications and PCT applications: No. 60/231,992 entitled Systems and Methods for Delivering Content Over a Computer Network, filed Sep. 11, 2000 and naming Joe D. Croman as an inventor; No. 60/108,602; Ser. Nos. 09/310,294; 09/311,923; 09/310,229; 09/439,906; and PCT/US99/27113, which are commonly assigned, co-pending applications. For purpose of clarity, the following description describes the structure and operation of the server 12 and the client 14, including the operation and structure of certain elements of the server 14 and client 12 which were also described with reference to the systems and methods shown in the co-pending applications identified above. However, for purpose of clarity, and to avoid redundancy, the above identified applications have been incorporated by reference to provide further understanding of these certain elements and the alternative embodiments, practices and uses of these certain elements.

The Illustrated Server

The depicted server 12 includes a server front end 16, a dispatcher 18, a RAFT (remote content) server 20, a plurality title briqs 22 a, b and c respectively, a plurality of title load maps 24 a, b and c respectively, and an optional profiler 28 and an optional running title 30.

The server front end 16 includes a web storefront 62, an e-commerce server 64 and a conditional access server 68. The server front end 16 allows a user to negotiate a transaction with the server 12 to purchase access to a title the user wishes to employ. The server front end 16 is in communication with the dispatcher 18. The dispatcher 18 illustrated in FIG. 1 discovers local RAFT servers, tracks their relative loading and bandwidth delivery, and provides this information upon request optionally to the conditional access server 16 and optionally the Player 38 of the client 14. There will typically be only one instance of the Dispatcher service running per bank of RAFT servers, although the design should allow for fail-over as well.

The Random Access File Transfer (RAFT) server 20 may be a read-only content server designed specifically for Internet-based content distribution. The RAFT server 20 may also be designed to enable proxy or cache servers on the network. The RAFT can enable dynamic bandwidth restrictions and employ other methods to prevent network congestion. More specifically, the RAFT server 20 is capable of serving content to the client 14. In particular, the client 14, after having negotiated with the store front 16 to purchase access to a title, contacts the RAFT server 20 to gain access to that title. The RAFT server 20 can verify that the client 14 has purchased access to a particular title 22, and can provide the client 14 with access to that title. To this end, the RAFT server 20 can process a request from the client 14 that includes a protocol version, the path name for the title and an access token. The protocol version is a 32-bit value used to verify that the client and server are protocol compatible. To validate access, the RAFT server 20 verifies the token is valid. In those applications where the user purchased a limited amount of access to the title, the RAFT server 20 can monitor the parameters of the users access requests to make sure they stay within prescribed limits. For example, the user may have purchased a limited amount of access time, or access to only certain portions of the title, or some other type of limited access. The RAFT server can check the token's parameters, such as its start and expiration times during the open. If the RAFT OPEN is successful, the RAFT server returns a RAFT file handle and a unique ID for the briq associated with the title. Typically, the RAFT access token will eventually expire, and the RAFT server 20 will no longer grant access to the title 22.

The RAFT server 20 may be implemented as an application executable on a POSIX.1 (IEEE Std 1003.1, 1998) compatible platform, such as the Sun Solaris® operating system commercially available from Sun Microsystems, Palo Alto, Calif., or the Linux operating system commercially available from Red Hat Software. The RAFT server may be implemented as a RAFT application and a Simple Network Management Protocol (SNMP) master agent executing on top of the operating system. A commercial product suitable for implementing the SNMP master agent is the Emanate product commercially available from SNMP Research, Inc. The master agent communicates with the network using published application program interfaces in accordance with the SNMP standards.

The server 12 further includes a plurality of titles 22 as shown in FIG. 1. In the embodiment of FIG. 1, a title 22 is formatted into an electronic package that contains the title's files in a compressed and encrypted form, referred to as a briq. Thus, title software used in the system of FIG. 1 is packaged in briqs 22. The briq 22 contains the executables, support software, and data files, arranged in the appropriate directory structure. Additionally, the briq may contain meta data that that supports an install abstraction, security, system requirements, and other processes and data for allowing the title to execute locally. At the layer connecting the client 14 with the server 12, data is fetched in discrete units, referred to as Blocks. For ease of management, the block size may be fixed at some power of 2, such as 32768 bytes. When the running on the client 14 makes requests for directory, executable or content information, which are to be satisfied from the associated briq 22, these requests are translated to some extent of bytes in the associated briq 22. The client 14 then fetches the Block or Blocks in which this extent of bytes is stored. The briq 22 is a portable, self-contained file system, containing files and meta-data to be employed to run a particular title. Briqs 22 are stored on the file server 12, or a storage device or system accessible by the server 12 or to which the server 12 can refer the client 14.

FIG. 1 shows that the server 12 includes a plurality of briqs 22. In the embodiment of FIG. 1, each of the depicted Title briqs 22 is associated with a separate title or titles. For each title briq 22 there are a plurality of title load maps 24. The different load maps 24 for each respective title briq 22, provide different loading profiles or loading schedules and methods for the respective title briq22, wherein the difference in loading profiles or load schedule and methods arises from the difference in network characteristics and throughput that can arise when users request access to a particular title. Thus, for example, during the course of a day, two separate users may negotiate access to the same title. To provide a quality user experience, the system 10 may determine the network characteristics and throughput available to server for delivering the blocks to the user. In this example, the first user may have a high speed cable access that is providing about 1 Mbit throughput and minimal latency. In contrast the second user may have a DSL connection that is presently burdened and is providing about 300 Kbit throughput with high latency. Thus the ability to provide the user with timely access to the data needed to run the title on the user's local machine differs between the two users. Thus, in the case of the first user, the server has 1 Mbit of throughput available and low latency. Throughput may be understood as the rate at which data may be transferred between the Raft server 20 and the player 38. The throughput is effected by the network resources, including bandwidth, latency, QoS and other factors. Thus, the server 12 can employ a schedule and method of access that downloads the blocks necessary to begin the title run, and can service the title's request for more blocks on demand on a network channel that provides 1 Mbit of throughput. In contrast, the server 12 has only 300 Kbit of throughput to service the second user. Thus, the client may need to preload a greater number of blocks into cache prior to the title starting in order to preserve the quality of play. In addition a second access method may be deployed by the client under these network conditions to request further blocks from the server, not on demand, after the title is running on the client predicting future needs of the title for data and executable. The point is that with high throughput between the server and the client less data needs to be preloaded into cache before the title is launched and more of it can be delivered real time as the title plays.

To address the possible disparity and changing network conditions of throughput available between the server 12 and different users, the system 10 of FIG. 1 provides a plurality of load maps 24, where the load maps 24 provide a delivery schedule and access methods that is adapted to support delivery of title content for the associated network characteristics and throughput in a manner that achieves a user experience for the running title that is similar or identical to the user experience the user would have if the title were running locally.

To this end, the load maps 24 contain information that the load map readers 52 on the client 14 can use to request blocks from the server 12 with a schedule and method that should make blocks available from cache before the running title 48 needs them, thus providing a user experience that is identical or similar to the user experience the user would have if the title were stored locally. To this end, load maps, like load map 24, work in conjunction with the local cache. If a request is made for data and it is not in the cache it goes directly to RAFT server. Thus, as the timeliness by which blocks may be transferred across the data network turns on the available network throughput and characteristics, a separate load map 24 may be generated for each network environment employed by users. Thus, if experience shows that users employ network connections providing one of three throughputs and characteristics, 3 Mbit or greater with QOS, 1 Mbit with high latency or 300 Kbit with low latency, each title can have three separate load maps, each providing a schedule and method of access suited for a respective one of the three bandwidths.

More specifically, the load maps 24 may describe the content access patterns of the titles 22, parameterized typically by time, by access history and by runtime state of title. Additionally load maps may contain the access methods to be deployed by for a given access pattern and runtime title state. The load maps 24 cooperate with associated load map readers 52, to provide vehicles for distributing information about title behavior and state, in terms of accessing blocks within the briq, to the client 14. The load maps 24 contain data and the load map readers 52 contain executable code to interpret the information of the load maps. The load map readers 52, monitoring the running titles briq network utilization, and operating on the data in the load map 24, perform the client cache transactions for sustaining the title experience when client bandwidth is limited. Typically, the processes the load map readers 52 employ are developed by observing and analyzing the behavior of a class of titles and developing algorithm and access methods that best support the class of behaviors. For individual titles data that defines title behavior is then collected from a number of title runs by the profiler 28, and aggregated and encoded into load maps 24 for the title that corresponds to the map reader and network conditions Additionally data that defines title behavior can also be collected from the cache manager 40 as titles are run my remote users.

Figure 2:
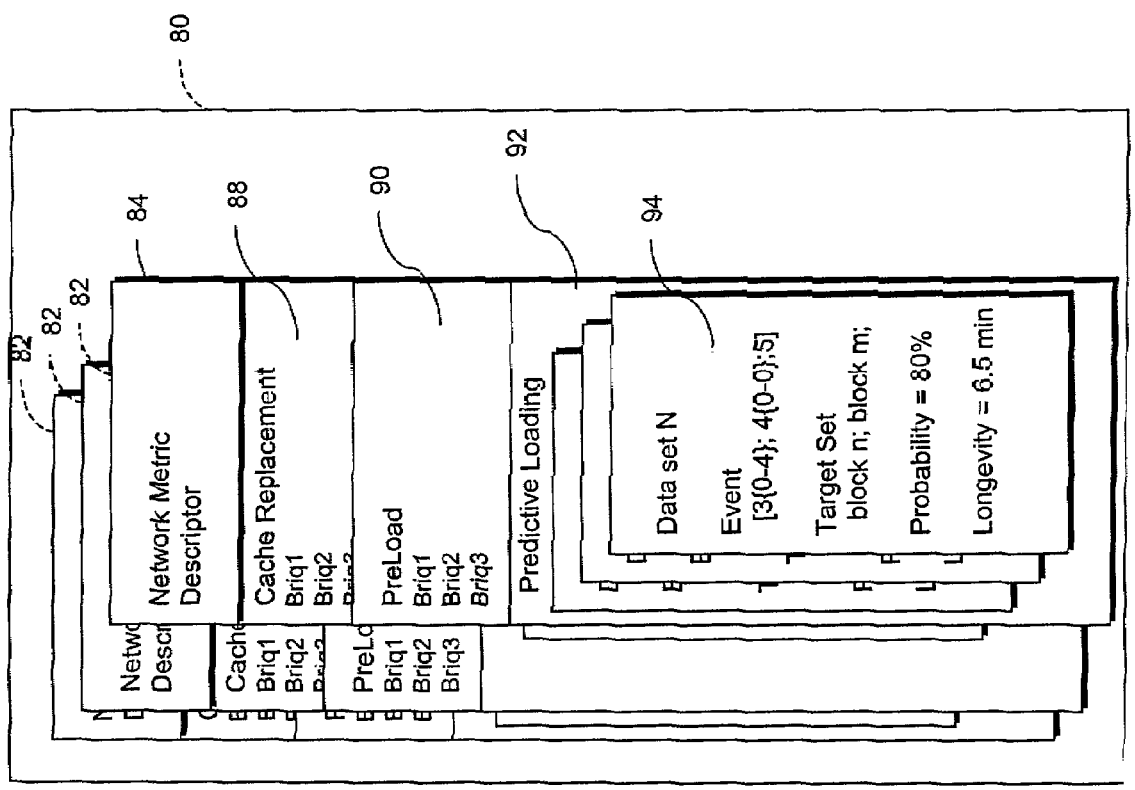
FIG. 2 depicts an example of a Load Map.

Load maps in the embodiment of FIG. 1 are stored in load map containers. One such load map container 80 is depicted in FIG. 2. Each load map container 80 is associated with one briq. A load map container 80 contains one or more load maps 82. Each title in the briq 22 is associated with a set of load maps 82 within the container 80. Each load map 82 in the set is associated with a Network Metric Descriptor 84.

In one practice, when choosing a load map 82 for a title session, the client 14 locates the load map container 80 for the title's briq 22, locates a title load map directory within the load map container 80, and selects the load map 82 within this directory which is associated with the Network Metric Descriptor 84 closest to the network environment in which the title session is to take place. Typically, the client 14 compares the available network throughput and characteristics with information within the Network Metric Descriptor 84, and makes the selection based on this comparison.

Each load map 82 may contain some or all of the following information stored in different fields within the container 80: cache replacement information 88; preload information 90; arid predictive loading information 92. Cache replacement information 88 can comprise information which is used by the client 14 when storing incoming data in the client's cache. This information can include, for example, the cache replacement algorithm to use, e.g., Least Recently Used (LRU), priority cache list or some other suitable algorithm for determining what information to keep in the cache. The information can also include the amount of cache space to be allocated exclusively for the title; and the relative caching priority of each briq block, used by the cache replacement algorithm when the subject block is considered for insertion into the cache.

The preload information may contain a list of briq blocks, which are to be present in the client's cache before the title's executable is launched. Typically, the faster the network throughput, the smaller the number of blocks that need to be preloaded into cache prior to the title starting execution. In either case, those blocks that need to be preloaded may be stored in the field 90 as an ordered list.

The load map 82 may optionally contain predictive loading information in field 92. This information may be used by the load map reader 52 to fetch briq content while the title is running, even though the title 48 has not yet accessed them. This information may include one or more of the following:

An ordered list of briq blocks to be fetched, without considering the progress of a particular title session. The client 14 is to fetch blocks on this list, in the given order, during periods when the running title's network activity permits. This list is known as a postload list.

Alternatively, the field 92 may contain a tree structure of sets of briq blocks, each set potentially associated with multitude of branching secondary sets. If the client detects that the blocks in one of the first sets are fetched by the title, then the blocks in the second set are to be loaded based on the probability access. This list is known as the Probabilistic loading List, and this is the type of list depicted in FIG. 2. The data structure associated with the Probabilistic loading technology is a structure including sets of data. Each of these sets contains the following elements: Event definition: A set of triggering events that would cause the cache manager 40 to signal the map reader to continue with its probabilistic post loading. The cache manager 40 may pass to the map reader 52 event information such that the map reader 52 could along with its current state determine which target set of blocks from the tree would be loaded next. Target set: An ordered list of blocks in the briq, which are likely to be required by the title in the near future.

Probability of correctness: The probability that, if the event is detected, the target set of blocks would be required by the running title. This is used when considering a plurality of events and choosing between them.

Longevity of prediction: The span of title activity (quantified in title briq accesses and/or in wall clock time), which the prediction claims to cover. After this span is exhausted (the title has performed this many briq accesses, or that much time has passed, since the putative event), the prediction is pronounced stale and would be ignored.

Thus, the load map 24 contains information that the load map reader may employ for downloading blocks from the briq in a manner that maintains the desired user experience.

Figure 3:
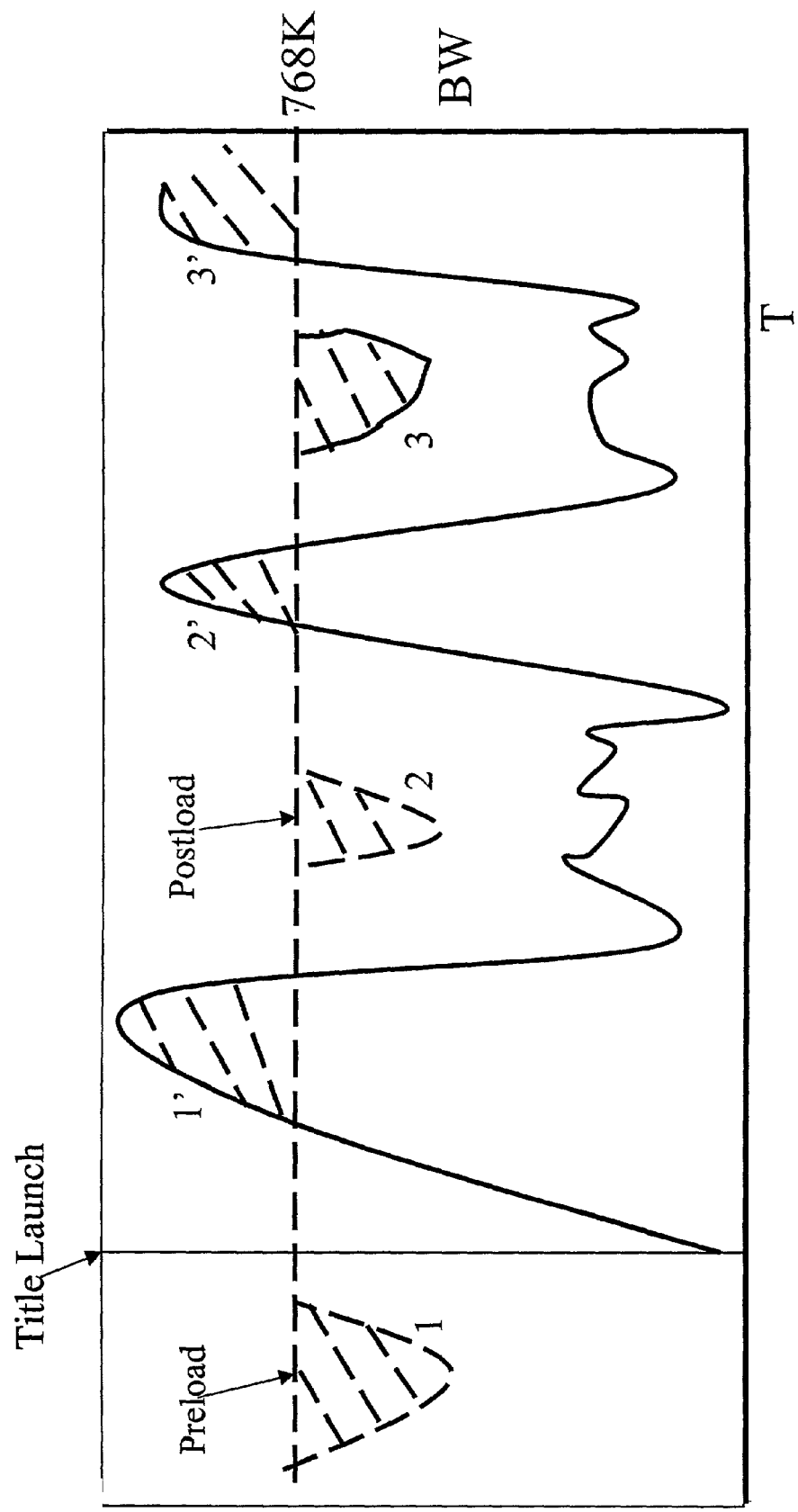
FIG. 3 depicts graphically the download demand for a title versus time.

Turning now to FIG. 3, one example of how a load map 24 may be employed for delivering content more efficiently over a network is depicted. Specifically, FIG. 3 depicts the load demand for a title over a period of time T. Also depicted in FIG. 3 is the available bandwidth. The available bandwidth is noted by the horizontal line BW, and for the depicted example the bandwidth is 768K. As can be seen during the time period T, the load demand for the title sometimes rises above the available bandwidth. These peak times are shown to as having dashed lines extending through the peaks (1', 2', 3'). Similarly, there are also times when the bandwidth available exceeds the bandwidth required by the running title. For instance, this may occur because the running title has loaded all the blocks it needs to support a task that typically requires the user to spend a meaningful amount of time performing the task. To address this issue the load map 24 may be employed to schedule delivery of blocks of the title during those times of excess bandwidth, and to employ those times to deliver data into a cache on the client. This is shown in FIG. 3 by the reversed peaks (1,2 3) that represent the delivery of blocks that are predicted to be needed in the future. This preloaded and postloaded data may then be accessed by the executing title, without requiring the system to employ the network.

The activity of the map reader to request data to be delivered over the network during times of excess capacity turns in part on the map reader's analysis of the load map. In particular, the load map may include a decision tree and access methods that sets out an outline for possible file access patterns for the title given certain operating conditions. The decision tree may be employed by the map reader to generate data requests to the RAFT server. By predictively caching portions of the executable, the system provides better real-time performance for the title.

The Profiler 28 component is the primary piece of the title preparation process. It observes the execution of a title 30 and creates one or more load maps 24 based on analysis of the title's disk access patterns and selected network characteristics. The process employed by the profiler 28 can depend upon the application. Typically, the profiler 28 monitors the access patterns of a title as a user employs the title. Additionally the profiler can receive and use title access patterns from remote users that access a deployed system. The profiler 28 can build a log of these accesses. Given some useful patterns, possible profiling and map reading algorithms can be tested and validated by simulation. Then the appropriate components can be developed to support each map type.

Note that the architecture of FIG. 1 depicts load maps 24 as distinct from the title briqs 22 for reasons of both clarity and efficiency: load maps will be comparatively small and are likely to be updated much more often than the title content. Load maps will need a version link to their corresponding briq so that RAFT server 20 data synchronization is not a problem. Logistical (distribution) issues could force load maps to become physically part of a briq, but such a change is within the skill of the ordinary artisan.

The load map format and map reader algorithms may vary according to application, and based on factors such as time, action within title, disk access, and quality of runtime experience (freezes), and statistical analysis may be employed to find patterns.

The two components which have direct knowledge of title delivery bandwidth are the RAFT server 20 and the cache manager 40 of the client 14. Each should track bandwidth and be queryable by the Dispatcher or Player/store front so that the customer can be presented with appropriate choices and estimates of delivery time.

In addition to the Dispatcher 18, it may also be desirable to have a daemon process that resides on the Client 14 which periodically measures bandwidth availability when the cache Manager 40 is idle. This would allow the Dispatcher to stay up-to-date with network conditions and be queryable directly by the server front end 16.

The Client

As shown in FIG. 1, the depicted client 14 includes a web browser 32 having plug in 34, a player 38, a cache manager 40, a plurality of title caches 42 a, b and c respectively, and a cache admin tool. As further shown, the client 14 includes a running title 48, a plurality of map readers 52 a, b and c respectively and a plurality of cached title load maps 54 a, b and c respectively. Although only one server 12 and one client 14 are depicted in FIG. 1, it will be understood that the systems and methods described herein include systems and methods where multiple servers 12 are employed and where each server may support a plurality of clients 14. For example, depending upon the application, the server 12 may support a thousand client systems 14.

The web browser may be any suitable web browsers, and typically comprises an HTML browser such as NetScape Navigator or Microsoft Explorer. For the depicted embodiment, the browser is provided a plug-in The Plug in allows the server front end 16 to communicate with the player: and to cause actions on the player side and to gather data such as version numbers, throughput measurements, and other information However, the type of browser employed will depend upon the application, and in those applications where the device is unable to support a typical browser, a proprietary client application may be provided for exchanging data with the server 12.

The player 38 depicted in FIG. 1 may be implemented as a Windows application containing logic which coordinates communication between the client 14 and the CAS 68. The player 38 may be invoked by the client's browser 32, and may include a library which may be implemented as a series of objects or program code which generate and receive communications to/from the CAS server 68 through a remote procedure call (RPC) library. The player 38 may also include a process for moving data across the network and for measuring available network resources and characteristics including throughput, bandwidth, latency, buffer capacity and other parameters. Additionally, the player is capable of processing information provided by the server 12 to determine for a title of interest to the user, which of the plurality of available load maps for that title should be employed.

Upon invocation of player 38, a graphic user interface (GUI) is presented to a user. In the illustrative embodiment, the user interface includes the appropriate program logic and/or objects necessary to interface with the operating system and application program (APIs) contained within the Windows or other operating systems or environments in order to render windows, present graphic information within such windows, and receive commands from a user via a keyboard, mouse or other input devices, such user interface being well within the scope of those reasonably skilled in the art. Through this GUI, the user may set user preferences, e.g., disk cache size, and be notified of error conditions. The player 38 can launch a title and continue communications between the client 14 and the CAS 68 and the RAFT server 20.

The depicted Player 38 is also an intermediary between the CAS and the cache manager. In the process of running a title, the player 38 locates the BSP's Dispatcher service 18 and queries it for information about a suitable RAFT server; tells the cache manager 40 which RAFT connection to make; provides the RAFT title or content access keys from the CAS to the cache manager 40, and refreshes them with the CAS 68 as needed configures the appropriate map reader 52a,b,c with network information, such as bandwidth and delay mode information; and starts/stops the application as needed.

The player's 38 interaction with the Dispatcher 18 may optionally include a bandwidth test. Also, the player 38 can launch the cache Admin. tool to manage local cache space if forced to do so by the requirements of new content, or by user's choice.

The depicted cache manager 40 maintains one or more local disk caches. Each cache may be associated with a specific body of content. The cache manager 40 responds to requests from the player 38, which configures it to connect with a specific RAFT server 20, briq 22, and load map 24. The cache manager 40 may also respond to the map reader 52a,b,c, which makes anticipatory load requests that are driven by the title's load map 54a,b,c and current execution state.

The cache manager 40 provides a block directly from the local disk when it is available, and makes a request of the RAFT server 20 for blocks it does not have a local copy of yet. The algorithm by which the cache is managed can be simple LRU optionally, may also encode and use load map information that preserves critical cache data which may not be accessed frequently by the title. The profiling process will determine substantially optimum cache size for each title, and possibly for each bandwidth tier in which title may execute.

The cache manager 40 also records the load state of the cache, which means that it knows which blocks are in cache. This information allows the map reader request that are not in cache to access the content server 20 and allows the player 38 to determine whether the title should be allowed to run or not.

The cache admin tool 44 provides a GUI which allows administration of local caches by the end user. It shows how much disk space is taken up by each title and allows the user to dispose of cache blocks for titles that are no longer needed. The user can start this tool manually or it may be run by the player 38 when reconfiguration of cache space is necessary.

As discussed above, the depicted map reader 52a,b,c interprets a profiler-generated, title-specific load map 54a,b,c that has been downloaded from the server 12 to the client 14. As shown in FIG. 1, for a given network state a separate load map 54a,b,c is present for each title 48. The load map 54a,b,c describes the content access patterns of the title application, parameterized by time and by access history. As discussed with reference to FIG. 3, the map reader 52a,b,c uses a load map 54a,b,c to create cache pre-load requests which are meant to anticipate the disk accesses of the title application. A proper load map allows a running title to be available as soon as possible and avoids title freezes during execution. To do this, the map reader 52a,b,c uses the profiler load map data to "lead" the title accesses by a time delta which will be variable during execution.

The Map Reader API and one or more illustrative load map formats and map readers may become a part of a title developer SDK as well.

Accordingly, FIG. 1 depicts a block diagram that shows the different elements of one embodiment of the invention, which embodiment comprises a system for delivering content over a data network to support execution of a program at a remote location. In the system 10 of FIG. 1 the server 12 and the client 14 cooperate to deliver portions of executable code over the data network in a manner that allows a user operating the client PC, or some other remote device, to execute the program on the remote device in a manner that provides for the same, or substantially same, user experience that the user would have if the executable code was part of a program that was stored locally and accessed by the client device. However, by applying the client server architecture of FIG. 1, the system 10 is capable of providing a server system that any client can access for the purpose of downloading a program, or title, that the user is interested in running. For this particular embodiment, the server 12 includes a front-end 60 that comprises a web storefront 62, an e-commerce server 64 and a conditional access server 68. The front-end 60 therefore provides an electronic storefront that may broker a transaction for allowing a user to purchase access to a title stored on, or otherwise accessible to, the server 12.

Operation of the Depicted System 10

In the depicted embodiment, users may select a title to run from a virtual storefront provided by the storefront system 16, which contains a virtual catalog of available titles. Upon selection of the title, the user negotiates for an actual purchase of the title. Negotiation may include user registration with a third party, electronic commerce system, provision of user billing information, and selection of one of the purchase types offered with the selected title. Examples of possible purchase types may include a time-limited demo of the title, a single payment for a single use" of a title, a single payment which allows unlimited "uses" of a title over some specified time period e.g., week, month, etc.

For the depicted embodiment, the server 12 includes the front-end 60 that provides the above-described electronic storefront. However, it will be apparent to those of ordinary skill in the art that the need for an electronic storefront, or any type of front-end navigational server depends on the application at hand and an alternative embodiment, the navigational server may be removed from the systems and methods described herein. Additionally, the particular embodiment of FIG. 1 shows the front-end server 60 as including a transactional e-commerce server 64. It will be understood that the transactional e-commerce server 64 may comprise a server system integrated into the Server 12, or, in alternate embodiments, may be supported by a third-party service provider such that the e-commerce server 64 may be located at a remote location and not integrated into the front-end 60. Other elements shown in the front-end 60 including the web storefront, may also, in whole or in part, be supplied or supported by third-party systems that are accessed, but remote from, the front-end 60.

However, continuing with the example system of FIG. 1, the user would negotiate a transaction to receive access to the title of interest. Upon completion of the purchase negotiation, then client software running on the user's PC obtains an authorization token and keying material from the Conditional Access Server (CAS) 68. The token authorizes the client 14 to run the selected title from the file server 12 across the network. The data retrieved from the file server 12 is encrypted. The client 14 uses the keying material provided by the CAS 68 to decrypt the data from the file server 12. In one specific example, the eCommerce server 64 generates a launch string, containing the information identifying and authorizing the purchase, including a Universal Resource Name (URN) uniquely identifying the desired title. The launch string may be digitally signed by the CAS 68 and provided to the eCommerce server 64 for delivery to the client 14.

The launch string, in one practice is wrapped with a MIME header. When the launch string is received by the client's browser 32, the MIME type associated with the launch string is located in a registry entry, which results in the invocation of a player module 38 within the client 14. The player module 38 establishes a secure RPC connection with the CAS 68 and requests that CAS provide a URL for the specified URN, i.e. a URN to URL conversion. The URL identifies the location of the corresponding title data. The CAS 68 forwards the corresponding URL to the player 38. Once the player 38 has identified the location of the corresponding data, the player 38 sends a purchase request to the CAS 68, the purchase request including the Launch string.

With this embodiment, titles run on the user's PC, but the title is not downloaded, in its entirety, onto the PC. A title is formatted into an electronic package that contains the title's files in a compressed and encrypted form, referred to as a briq. The briq is a portable, self-contained file system, containing the data that makes up the files to be employed to run a particular title. Briqs are stored on the file server 12, or a storage device or system accessible by the server 12 or to which the server 12 can refer the client 14. The server that manages the titles is referred to hereafter as the RAFT server 20. The client 14 treats the briq like a local file system on the user's computer. When running a title, the operating system, e.g. Windows, makes read requests to this local file system. The client 14, which, in the illustrative embodiment, includes a cache manager 40, services these requests by retrieving the requested blocks of briq data from the RAFT server 20. After retrieving the requested block of data, cache manager 40 decompresses and decrypts the briq data, and passes the data onto the operating system on the user's computer.

Turning to FIG. 1, one example of such an operation can be described. Specifically, for the system 10 of FIG. 1 the CAS 68 verifies the launch string's signature, and then returns a RAFT authorization token and activator to the player 38. The authorization token may be actually embedded within the activator. Next, the player 38 launches the title by passing the activator to the cache manager 40. The cache manager 40 runs the activator and opens the URL and reads the header. The cache manager 40 sends the initial authorization token to the RAFT Server 20. The cache manager 40 staffs reading content from RAFT server 20. The cache manager 40 uses the activator to decrypt and decompress the content in the form of briq data, and perform integrity checking on the blocks of decrypted data.

Thereafter, the operating system executes the title, via the local file system presented by cache manager. Periodically, the activator requests the player 38 to ask the CAS 68 to refresh the activator and the RAFT authorization token. Upon the first of such requests, the CAS 68 posts the purchase to the eCommerce server 64 for transaction settlement. The lifetime of the first activator may be on the order of minutes. Successful activator refresh after the first timeout serves as an indication that the title is running successfully on the client 14.

Thus, in this embodiment the software title is never "installed" on the client 14. The client 14 creates an installation abstraction, maintaining the illusion for the operating system that the title currently executing is installed on the host computer. Thus, when execution of the title is terminated, there is no remaining evidence the title ran on the system. No files associated with the title are left on the computer's hard-drive, and no operating system state information e.g., registry variables associated with the title, remains. Optionally, users of titles have the option of saving certain state information that would be desirable to maintain across plays; e.g., the "level" achieved in a game, etc. Such state information may be saved in write through file described hereinafter.

Optionally, the client 14 uses the Random Access File Transport (RAFT) protocol to retrieve briq data across the network. The protocol, in one practice, may provide the client 14 with read-only access to files and directories stored on RAFT server 20. Because the briq is treated like a local file system, the RAFT client does not need to be visible as an operating system drive and does not need to interface with the operating system's file system manager, the Windows Installable File System (IFS) Manager in the illustrative embodiment. As a result, the RAFT client file system driver, the cache manager 40 in the illustrative embodiment, is smaller and simpler than a remote or network file system driver. Optionally, the RAFT protocol supports dynamic bandwidth restrictions, e.g., "bandwidth throttling", and access control through the use of RAFT authorization tokens.

The client 14 may employ a variety of security mechanisms to protect content from unauthorized access and replay. Authorization tokens and decryption keys are obtained from a CAS 68. Network communication between the client 14 and CAS 68 may be protected via a secure remote procedure call (RPC) interface. Once a secure channel is established between client 14 and CAS 68, the client 14 requests a RAFT authorization token and keying material for the selected title. The authorization token, in one embodiment may be a signed message from the CAS 68 indicating that the requesting user can have access to a specified briq, on a specific RAFT file server 20, for the length of time spelled out in the negotiated payment type.

While the RAFT authorization token gives a client 14 access to a title's briq, the client 14 in certain embodiments, is to unpack, e.g. decompress and decrypt, the briq to gain access to the title's file data. The CAS 68 provides the user with the keying material to decrypt briq data. In one practice, the CAS 68 does not directly provide the client 14 with keying material. Instead, the CAS 68 may hide keying material from the user by embedding the keys in obfuscated bytecode that implements the decryption algorithm. Rather than delivering isolated keying material to the client 14, the CAS 68 delivers obfuscated bytecode, referred to as an activator. The client's cache manager 40 decrypts briq data by running the activator on a bytecode interpreter. Optionally, both the RAFT authentication tokens and activators may have a limited lifetime. For example, in certain embodiments, authorization tokens include an expiration time, after which they are no longer valid. Similarly, a running activator, at a certain point, may initiate an exchange with the CAS 68 to refresh itself. If the exchange is unsuccessful, the activator becomes inoperable and the title inoperable. The refreshing of activators is referred to as activator keep alive.

It will be understood that the system depicted in FIG. 1 maybe supported by or implemented on conventional data processing equipment. For example, the client systems can be any suitable computer system such as a PC workstation, a handheld computing device, a wireless communication device, or any other such device, equipped with a network client capable of accessing a network server and interacting with the server to exchange information with the server. In one embodiment, the network client is a web client, such as a web browser that can include the Netscape web browser, the Microsoft Internet explorer web browser, the Lynx web browser, or a proprietary web browser, or web client that allows the user to exchange data with a web server, and ftp server, a gopher server, or some other type of network server.

The servers may be supported by a commercially available server platform such as a Sun Sparc™ system and running a server capable of connecting with, or exchanging data with, one of the subscriber systems. In the embodiment of FIG. 1, the server includes a program for delivering content over a TCP/IP data network. Such programs may be written using principles known in the art.

It will be noted that FIG. 1 depicts the elements of the systems as functional block elements. However, it will be apparent to one of ordinary skill in the art that these elements can be realized as computer programs or portions of computer programs that are capable of running on the data processor platform to thereby configure the data processor as a system according to the invention. The elements, such as the player and profiler can be realized as a software component operating on a conventional data processing system such as a Unix or Windows workstation. In that embodiment, these mechanisms can be implemented as a C language computer program, or a computer program written in any high level language including C++, Fortran, Java or basic. General techniques for high level programming are known, and set forth in, for example, Stephen G. Kochan *Programming in C*, Hayden Publishing (1983).

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

We claim:

1. A method of transmitting data over a network, to support execution of an executable program at a client, the method comprising:
   determining availability of throughput for transmitting data over the network,
   identifying an executable program stored at a server to be executed at the client using the network,
   receiving at the client over the network a forward-looking load map identifying portions of the executable program for pre-fetching, and
   based on the load map, generating and sending from the client over the network an anticipatory load request for one or more of the identified portions before the one or more portions are needed for execution of the executable program at the client within the throughput, thereby maintaining consistent execution of the executable program at the client.

2. The method of claim 1, wherein the portions comprise portions of at least one of data or an executable file.

3. The method of claim 1, wherein the portions are received from a server at the client.

4. The method of claim 3, wherein the generating by the client is based on an amount of the throughput and information related thereto in the load-map.

5. The method of claim 3, further comprising:
   the client receiving a key adapted to access the portion for transmission from the server to the client.

6. The method of claim 1, wherein identifying portions of the executable program for pre-fetching includes selecting information based on the available throughput and an execution state of the program at a time of selection.

7. The method of claim 1, wherein the forward-looking load map is generated based an access pattern of the executable program.

8. A system for transmitting structured information over a network having an identified available throughput to allow a remote user to access an executable program at a remote location for local execution, comprising:
   a server providing the structured information to be transmitted to a client over the network to support execution of the executable program at the client,
   a profiler monitoring execution of the executable program and generating at least one load map based on an analysis of an information access pattern of portions of the executable program,
   receiving, from a map reader at the client, requests for portions of the executable program that are based on the at least one load map and available throughput before the portions are known to be needed for execution of the executable program at the client, and
   sending responses to the requests to a cache manager at the client to make the portions available for use by the client should they become needed for execution of the executable program at the client.

9. The system of claim 8, the cache manager further including storage means to store at least the information associated with a pre-load operation.

10. The system of claim 9, wherein the cache manager selects for merging a block of the information from the storage means, if the block is available, and requests a block from the server, if the block is not yet available.

11. The system of claim 8, further comprising a layer which arranges for the execution of the structured information.

12. A method for providing multiple levels of support to allow a remote user to access an executable program at a remote location over a computer network for local execution wherein the executable program has blocks of executable code, comprising:
   providing, for a plurality of network performance levels, a plurality of load maps associated with respective ones of said network performance levels and having a list of sections of executable code of the executable program ordered according to the expected priority of access of the executable code by the executable program,
   determining a network performance level available through the network to a client,
   selecting a load map from the plurality of load maps as a function of the network performance level available, and
   allowing the client to request sections of the executable program according to the load map selected.

13. A method according to claim 12, further including processing the program to generate the plurality of load maps.

14. A method according to claim 13, wherein processing the program includes determining for a respective network performance level a preload list representative of a series of sections of executable code that are to be transmitted over the network prior to execution of the program.

15. A method according to claim 13, wherein processing the program includes monitoring execution of the program to determine a sequence of block fetches for moving sections of executable code into computer memory and cache during program execution.

16. A method according to claim 13, wherein generating an ordered list includes ordering the list to provide a delivery sequence for scheduling delivery of sections of executable code over the network to the client.

17. A method according to claim 13, wherein processing the program includes generating the ordered list to schedule transmission of executable code over the network during a period of low network activity during program execution.

18. A method according to claim 12, wherein determining a network performance level includes launching a player program at the client capable of exchanging information with a remote server for determining the available network bandwidth.

19. A method according to claim 12, wherein determining a network performance level includes launching a player program at the client capable of exchanging information with a remote server for determining network latency.

20. A method according to claim 12, wherein determining a network performance level includes determining cache memory available at the client.

21. A method according to claim 12, wherein selecting a load map includes comparing a network performance level to a threshold level and preceding to selecting of a load map as a function of the comparison.

22. A method according to claim 12, further including selecting one of a plurality of servers for transmitting information.

23. A method for providing multiple levels of support to allow a remote user to access an executable computer program at a remote location over a computer network for local execution wherein the executable program has blocks of executable code, comprising:
   providing a file system management process for monitoring file access operations of the executable computer program executing within an application memory space,
   executing the executable computer program,
   employing the file system management process, while the executable computer program is being executed, for determining a sequence and a timing pattern with which blocks of executable code are loaded into the application memory space, and
   processing the sequence and timing pattern to generate a load map representative of a sequence and timing pattern for transmitting blocks of executable code of the executable computer program over the network.

24. A method according to claim 23, wherein processing the sequence and timing pattern includes generating a plurality of load maps each associated with a respective level of network performance.

25. A method according to claim 23, wherein executing the program includes executing the program a plurality of times to identify a plurality of optional sequence and timing patterns for loading blocks of the executable program into application memory space.

26. A method according to claim 23, wherein generating the load map includes processing the sequence and timing pattern to determine a preload factor representative of a number of blocks of executable code that are to be transmitted for enabling execution of the program over the network.

27. A process according to claim 23, wherein generating a load map includes processing the sequence and timing pattern to identify periods during program execution available for transmitting additional blocks of executable code.

28. A process according to claim 27, including determining probabilistically the additional blocks of executable code to deliver over the network.

29. A process according to claim 23, wherein processing the sequence and timing pattern includes collecting information representative of blocks of executable code requested from a remote site and adjusting the load map as a function of the collected information.

30. A process according to claim 23, further including adding trigger controls within the generated load map for controlling post-load execution on a client based on programs file accesses.

31. A process according to claim 23, further comprising providing a map reader process for execution on the client and for reading the load map to determine a sequence for requesting blocks of executable code from a remote server.

32. A method for a client to pre-fetch portions of an executable, the method comprising:
   receiving, at the client, via a network, a load map, the load map comprising information indicating portions of the executable to pre-fetch;
   using, at the client, the load map to identify a portion of the executable to be pre-fetched before such portion is needed by the client for execution of the executable;
   sending, via the network, a request for the identified portion;
   receiving the portion of the executable via the network; and
   caching the portion of the executable at the client and using the cached portion for execution of the executable responsive to a later determination by the client that the portion is needed by the client for execution of the executable.

33. A method for one or more servers to, individually or cooperatively, facilitate pre-fetching of portions of executables by clients executing the executables, where the executables are copied portion-wise to the clients and executed thereon, the method comprising:
   receiving requests from the clients to execute the executables;
   causing load maps to be sent to the clients that request execution of executables corresponding to the load maps, where load maps comprise information for predicting portions of corresponding executables likely to be needed for execution thereof;
   receiving from the clients requests for portions of the executables, the requests having been generated based on the load maps before being needed by the clients; and
   sending the requested portions of the executables to the corresponding requesting clients.

34. A method according to claim 33, wherein the load maps are generated based on patterns of accessing portions of the executables during execution thereof.

35. A method according to claim 33, wherein the load maps are generated by automatically determining portions of the executables as being likely to be accessed during execution of the executables and indicia of the portions are included in the load-maps based on the determining.

36. A method according to claim 33, wherein the load maps comprise an order of portions to be downloaded prior to execution of the executables at the clients, the order comprising portions ordered according to their respective probabilities of being needed for execution.

37. A method according to claim 33, wherein the load maps identify first portions of the executables and second portions of the executables, and wherein the requests were generated based on the load maps by identifying and requesting the second portions in response to execution within the first portions.

38. A method according to claim 33, wherein the load maps comprise an order of portions of the executables to be downloaded before and/or after execution of the executables at the clients.

* * * * *

UNITED STATES PATENT AND TRADEMARK OFFICE
CERTIFICATE OF CORRECTION

PATENT NO. : 7,225,264 B2  
APPLICATION NO. : 09/951124  
DATED : May 29, 2007  
INVENTOR(S) : Croman et al.

Page 1 of 1

It is certified that error appears in the above-identified patent and that said Letters Patent is hereby corrected as shown below:

On the Title Page of the patent, Section 60, Related U.S. Application Data: "Provisional application No. 60/231,992, filed on Sep. 11, 2000, provisional application No. 60/108,602, filed on Nov. 16, 1998." should read -- Provisional application No. 60/231,992, filed Sep. 11, 2000. Continuation-in-part of application No. 09/310,229, filed May 12, 1999, now Pat. No. 6,763,370, which claims the benefit of provisional application No. 60/108,602, filed Nov. 16, 1998. Continuation-in-part of application No. 09/310,294, filed May 12, 1999, now Pat. No. 7,017,188, which claims the benefit of provisional application No. 60/108,602, filed Nov. 16, 1998. Continuation-in-part of application No. 09/311,923, filed May 12, 1999, now Pat. No. 6,374,402, which claims the benefit of provisional application No. 60/108,602, filed Nov. 16, 1998. Continuation-in-part of application No. 09/439,906, filed November 12, 1999, now abandoned, which claims the benefit of provisional application No. 60/108,602, filed Nov. 16, 1998. --.

Signed and Sealed this

Eighth Day of July, 2008

JON W. DUDAS  
*Director of the United States Patent and Trademark Office*